US012170004B1

(12) United States Patent
Kelly et al.

(10) Patent No.: US 12,170,004 B1
(45) Date of Patent: Dec. 17, 2024

(54) DYNAMIC WAGER DELAYS FOR LIVE CONTEST BETTING

(71) Applicant: FanDuel Limited, Edinburgh (GB)

(72) Inventors: Lorcan Kelly, Los Angeles, CA (US); Oliver Hoy, Jersey City, NJ (US); Stefan Borjesson, Oporto (PT); Tiago Martins, Oporto (PT); Will Twinn, Jersey City, NJ (US)

(73) Assignee: FanDuel Limited, Edinburgh (GB)

( * ) Notice: Subject to any disclaimer, the term of this patent is extended or adjusted under 35 U.S.C. 154(b) by 0 days.

(21) Appl. No.: 18/406,974

(22) Filed: Jan. 8, 2024

(51) Int. Cl.
*G07F 17/32* (2006.01)

(52) U.S. Cl.
CPC ...... *G07F 17/3288* (2013.01); *G07F 17/3237* (2013.01); *G07F 17/3241* (2013.01)

(58) Field of Classification Search
CPC ............. G07F 17/3288; G07F 17/3237; G07F 17/3241
See application file for complete search history.

(56) References Cited

U.S. PATENT DOCUMENTS

| | | | | |
|---|---|---|---|---|
| 11,282,333 | B1 * | 3/2022 | Huke | G07F 17/3241 |
| 2013/0225282 | A1 * | 8/2013 | Williams | G07F 17/32 463/29 |
| 2022/0406146 | A1 * | 12/2022 | Hall | G07F 17/3225 |

* cited by examiner

*Primary Examiner* — James S. McClellan
*Assistant Examiner* — Ross A Williams
(74) *Attorney, Agent, or Firm* — Erise IP, P.A.

(57) ABSTRACT

Systems, methods, and computer-readable media for dynamically generating wager delays for live betting are disclosed. During a live contest, a wager delay may be enacted on any wagers placed. The wager delay may be dynamic such that the time of the wager delay changes throughout the contest. The wager delay may be determined based on a state of the contest, such as whether the contest is in a live state or is in a break state. When the contest is in the break state, the wager delay may be lowered or disabled until the contest returns to the live state. The wager delay may be applicable to only users determined to be wagering on the contest while also in-attendance at the contest.

20 Claims, 8 Drawing Sheets

DYNAMIC WAGER DELAYS FOR LIVE CONTEST BETTING

BACKGROUND

1. Field

Embodiments of the present disclosure relate to wagering or betting on contests. More specifically, embodiments of the present disclosure relate to dynamically setting a wager delay for wagers placed on live contests.

2. Related Art

Live betting is the act of betting on a contest, such as a sport, while the contest is live. This is in contrast to pre-match betting where bets (or wagers) are placed before the contest begins and are locked when the contest begins. For bookmakers that offer live betting on contests, a security risks exists because users can take advantage of the live nature of the betting. For example, a user who is in person at the contest while also betting on the contest can place bets based on events occurring in the contest but before the event is communicated to the bookmaker such that the bookmaker can update their offerings (e.g., odds and/or markets) appropriately. As a specific example, a bookmaker may offer a market on the odds a baseball player hits a home run. When the baseball player hits a home run, the market may be removed from offering. If the player hits the home run, in-attendance bettors can place a bet quickly after the home run is hit and before the event is communicated to the bookmaker for updating their odds such that the bettor is guaranteed to win the bet.

Bet or wager delays can be set for live betting that prevents the processing of a wager to allow the bookmaker time to process any changes that need to occur based on events occurring in the contest; however, the wager delays are typically inefficiently implemented. For example, if manually set, the wager delays are prone to errors due to the large amount of real-time data that needs to be processed to correctly set the wager delay, which can lead to bettors taking advantage of incorrectly set wager delays. Improvements in dynamically setting wager delays are needed.

SUMMARY

In some embodiments, the techniques described herein relate to a system for dynamically enacting delays for placing wagers, including: at least one server communicatively coupled to a live contest service configured to transmit live contest data of a contest to the at least one server; and one or more non-transitory computer-readable media storing computer-executable instructions that, when executed by at least one processor, cause the system to carry out actions, including: receiving, during the contest and from a user operating a user computing device, a request to place a wager on the contest; determining a location of the user; responsive to determining the location of the user is a contest location for the contest, determining a state of the contest based on the live contest data received from the live contest service; responsive to determining the state of the contest is a live state, enacting a wager delay for the wager; and responsive to the wager delay ending, allowing placement of the wager by the user.

In some embodiments, the techniques described herein relate to a system, wherein the user is a first user, the wager is a first wager, the request is a first request, and wherein the actions further include: receiving, from a second user, a second request to place a second wager on the contest; determining a second location of the second user; and responsive to determining the second location of the second user is not the contest location, allowing placement of the wager by the second user without enacting the wager delay on the second wager.

In some embodiments, the techniques described herein relate to a system, wherein determining the location of the user is based on a geolocation obtained from the user computing device.

In some embodiments, the techniques described herein relate to a system, wherein determining the location of the user is based on comparing a network that the user computing device is connected to one or more networks associated with the contest location.

In some embodiments, the techniques described herein relate to a system, further including one or more sensors at the contest location configured to capture first audio data of the contest, and wherein the actions further include: receiving second audio data from the user computing device; and setting the wager delay based on a comparison of the first audio data to the second audio data.

In some embodiments, the techniques described herein relate to a system, wherein the comparison of the first audio data to the second audio data includes determining a temporal difference in volume spikes in the first audio data and the second audio data to determine a time delay of the user viewing the contest.

In some embodiments, the techniques described herein relate to a method for dynamically enacting delays on wagers, including: receiving, during a contest, a plurality of contest data for the contest; determining, based on the plurality of contest data, whether the contest is in a live state or a break state; responsive to determining the contest is in the live state, determining a wager delay for placing a wager on the contest; receiving, from a first user operating a first computing device, a first request to place a first wager on the contest; responsive to determining a first location of the first user is a contest location of the contest, enacting the wager delay for the first user; receiving new contest information for the contest; and responsive to determining the contest is in the break state based on the new contest information, disabling the wager delay for the first user.

In some embodiments, the techniques described herein relate to a method, wherein the method further includes: receiving, from a second user operating a second computing device, a second request to place a second wager on the contest; and responsive to determining a second location of the second user is not the contest location, allowing the wager to be placed without the wager delay.

In some embodiments, the techniques described herein relate to a method, wherein determining whether the contest is in the live state or the break state includes parsing the plurality of contest data for information indicative of a state of the contest.

In some embodiments, the techniques described herein relate to a method, wherein the state is a break state, and wherein a time for the wager delay is based on a type of the break state.

In some embodiments, the techniques described herein relate to a method, wherein the method further includes adjusting a wager limit based on the plurality of contest data.

In some embodiments, the techniques described herein relate to a method, wherein the wager delay is a first wager delay and wherein the method further includes: enacting, for a second user at the contest location, a second wager delay distinct from the first wager delay.

In some embodiments, the techniques described herein relate to a method, wherein the method further includes: responsive to determining one or more past wagers of the first user are indicative of suspicious activity, adjusting the wager delay for the first user.

In some embodiments, the techniques described herein relate to one or more non-transitory computer-readable media storing computer-executable instructions that, when executed by at least one processor, perform a method of dynamically setting wager delays for placing wagers on a contest, including: receiving, during a live contest and from a user operating a user computing device, a request to place a wager on the live contest; responsive to receiving the request, determining a location of the user; responsive to determining the location of the user is a contest location of the live contest, placing a wager delay on the wager; receiving, in real time, a plurality of contest data from a live contest service; determining a time for the wager delay based on the plurality of contest data; and allowing the wager to be placed after the time for the wager delay elapses.

In some embodiments, the techniques described herein relate to a media, further including: receiving an additional request to place an additional wager on the live contest; responsive to receiving, from the live contest service, new contest data, determining an adjusted time for the wager delay based on the new contest data; and allowing the additional wager to be placed after the adjusted time for the wager delay elapses.

In some embodiments, the techniques described herein relate to a media, wherein the new contest data indicates a break period for the contest, and wherein the adjusted time for the wager delay is zero.

In some embodiments, the techniques described herein relate to a media, wherein the wager delay is a first wager delay, and further including: enacting a second wager delay throughout the live contest, wherein the first wager delay is added to the second wager delay.

In some embodiments, the techniques described herein relate to a media, further including adjusting a wager threshold based on the plurality of contest data.

In some embodiments, the techniques described herein relate to a media, wherein the user is associated with a user value, and wherein determining the time for the wager delay is further based on the user value.

In some embodiments, the techniques described herein relate to a media, wherein the user is a first user, the request is a first request, the wager is a first wager, and the time is a first time, and further including: receiving, from a second user, a second request to place a second wager on the contest; and setting, for the second user, a second time for the wager delay distinct from the first time for the first user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE FIGURES

Embodiments of the present disclosure are described in detail below with reference to the attached drawing figures, wherein.

Figure 1:
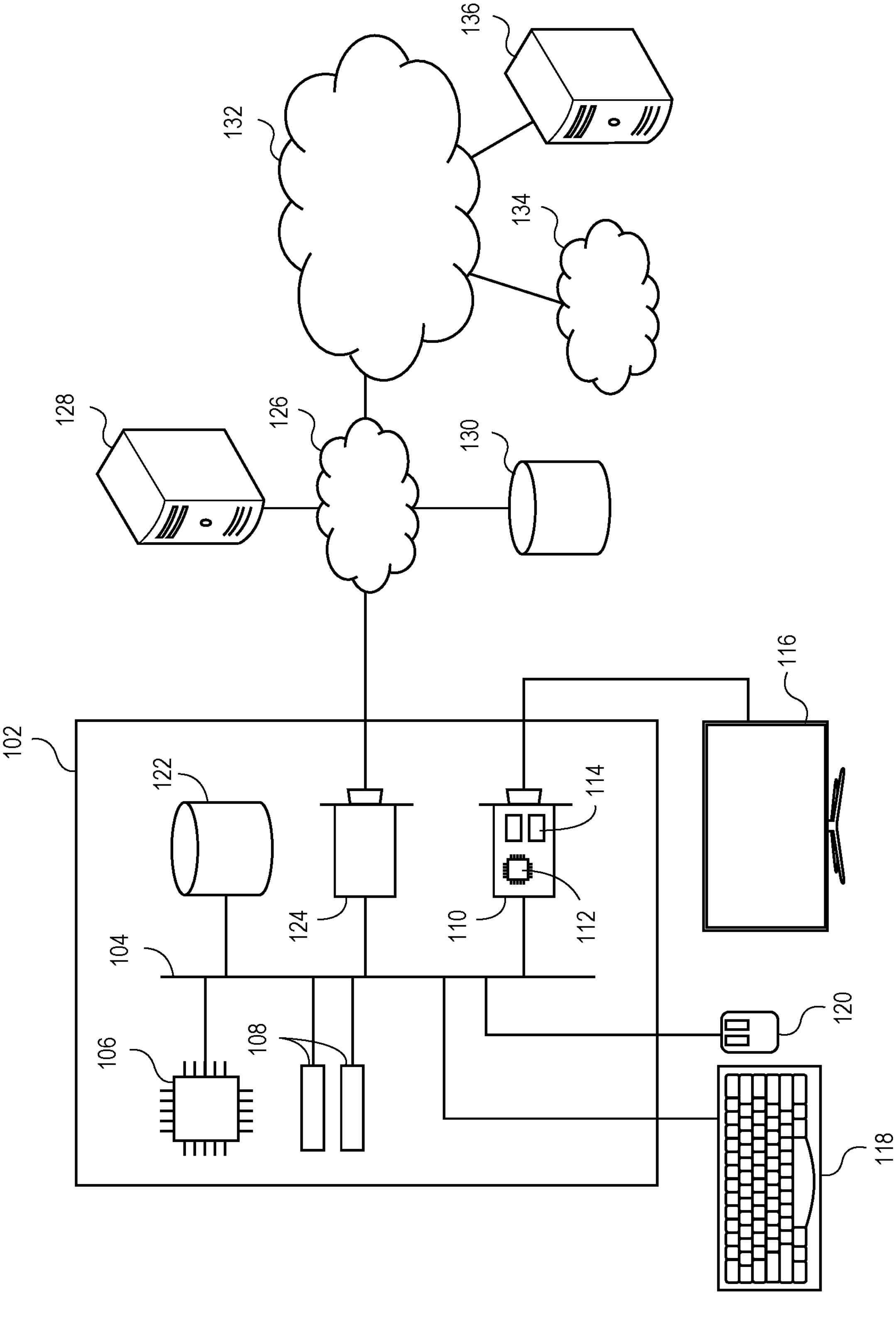
FIG. 1 depicts an exemplary hardware platform relating to some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the present disclosure are generally directed to dynamically setting a delay on the placement of a wager on a contest during the contest. Live wagering on contests is exploitable by users at the contest who can place a wager on an event after the event happens but before the event is communicated to the wager provider. For example, the user may be in attendance at a football game and placing wagers on the football game while watching the football game. The user may be able to place a wager on the odds of a player scoring a touchdown for example. If the user places a wager on a specific player scoring a touchdown immediately after the player scores a touchdown but before the event of the player scoring the touchdown is communicated to the wager provider, a security issue arises because the user is able to act on information that the wager provider does not yet have. Accordingly, a wager delay may be set by the wager provider that prevents users from placing a wager until the delay time elapses. This wager delay may be an additional wager delay added to a static wager delay enacted throughout the duration of a live contest.

The wager delay may be dynamically set and may only be enacted for those users who are known to be attending the contest for which the wager is being placed. As such, the wager delay may not be enacted for those users who are wagering on the contest that are not attending the contest in person. Further, the wager delay may be contest specific such that in-attendance users can place wagers on other contests without a wager delay. For users determined to be attending the contest, the wager delay may vary during the contest. Contest data may be used to determine the wager delay. For example, for a football game, the contest data may indicate that the football game is in the middle of a TV timeout and, as such, the wager delay may be set to zero to allow users to place wagers without any delay. When the contest data indicates the football game is back to a live state, i.e., when play resumes, the wager delay may be enacted. The contest data may be received via an API, for example, and may also include the data used by the wagering provider to adjust the wager offerings, such as the odds on a market.

Embodiments of the present disclosure solve the technical problems associated with live contest wagering by providing dynamically generated wager delays. The technical solution discussed herein may reduce the error rate in correctly enacting wager delays present in prior systems. By extracting state information for a contest, as discussed in further detail below, the accuracy for determining when a wager delay should be enabled may be improved. Furthermore, embodiments discussed herein may improve security for electronic wager providers by eliminating abuse of in-contest live wagering via determining users that are live betting on a contest while also attending the contest in person.

Turning to FIG. 1, an exemplary hardware platform for certain embodiments is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple buses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently and may be non-transitory computer-readable media storing data or computer-executable instructions. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth®, or Wi-Fi (i.e., the IEEE 102.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

System Overview

Figure 2:
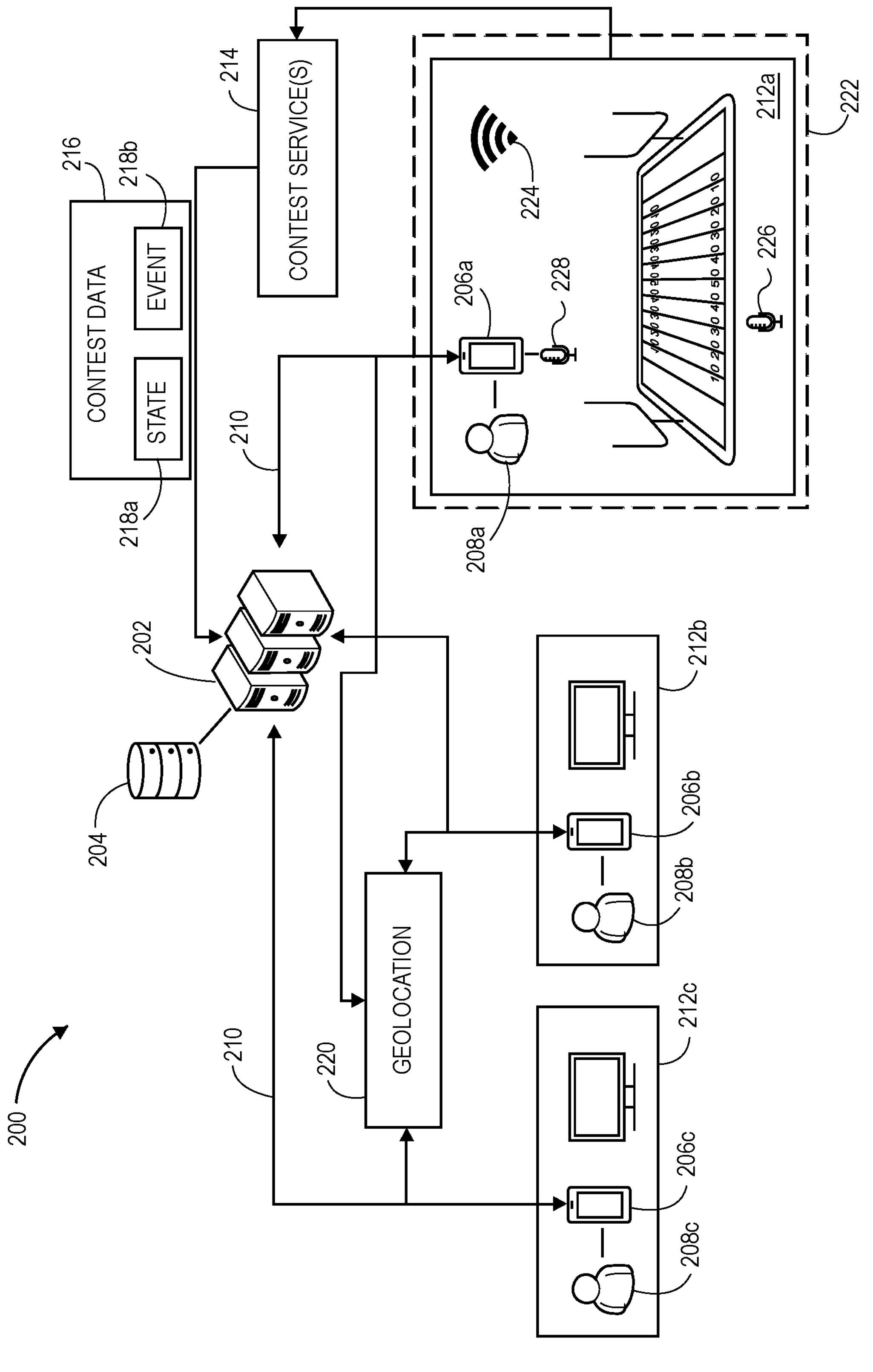
FIG. 2 depicts an exemplary system in accordance with embodiments of the present disclosure.

FIG. 2 illustrates a wagering platform or system 200 in accordance with embodiments of the present disclosure. System 200 may be associated with a wagering service or platform in which users can place wagers on live contests. System 200 may include one or more server computing devices ("servers") 202. In at least one example, the server 202 can include one or more servers or other types of computing devices that can be embodied in any number of ways. For example, the functional components and data of the server can be implemented on a single server, a cluster of servers, a server farm or data center, a cloud-hosted computing service, a cloud-hosted storage service, or the like. Server 202 may be coupled to one or more databases 204. Databases 204 may store various data for server 202, such as geolocation data of users, user wager history, contest locations, and the like as discussed further below.

The server 202 can communicate with user computing devices 206*a*, 206*b*, 206*c*, which may be operated by respective users 208*a*, 208*b*, 208*c*, via one or more networks 210. The server 202 and the computing devices 206*a*, 206*b*, 206*c*, 206*c* can transmit, receive, and/or store data (e.g., content, information, or the like) using the network 210. The user computing devices 206*a*, 206*b*, 206*c* can be any suitable type of computing device, such as a tablet computing device, a smart phone, a laptop, a desktop computing device, or any other computing device discussed above with respect to FIG. 1. While three computing devices 206*a*, 206*b*, 206*c* are illustrated, system 200 may include any number of computing devices operated by any number of users. The computing devices 206*a*, 206*b*, 206*c* can, among other functions, be operable by users 208*a*, 208*b*, 208*c* to interface with the wagering platform to place wagers on contests in accordance with embodiments of the present disclosure. For example, the computing devices 206*a*, 206*b*, 206*c* may execute an application for interfacing with server 202 to place wagers on contests. Exemplary user interfaces that may be displayed by the application are discussed below with respect to FIGS. 6A-6C. In some embodiments, server 202 is configured to operate to dynamically determine, set, enable/disable, or any combination thereof, a wager delay for live wagers placed by users 208*a*, 208*b*, 208*c* on a contest during the contest.

Network 210 can include, but is not limited to, any type of network known in the art, such as a local area network or a wide area network, the Internet, a wireless network, a cellular network, a local wireless network, Wi-Fi and/or close range wireless communications, Bluetooth®, Bluetooth Low Energy (BLE), Near Field Communication (NFC), a wired network, or any other such communication network, or any combination thereof.

As illustrated, the contest is taking place at a contest location 212*a*. First user 208*a* is also at the contest location 212*a*. For example, the contest may be a football game, and the first user 208*a* is in attendance at the football game and watching the game in real time. While at the contest, the first user 208*a* may operate first computing device 206*a* to place wagers on the likelihood of events occurring or not occurring during the contest as is known to those skilled in the art. The first user 208*a* may use an application provided by system 200 downloadable to device 206*a*, and the wager may be communicated to server 202 via one or more networks 210.

Second user 208*b* and third user 208*c*, by contrast, are at a second location 212*b* and a third location 212*c*, respectively, that are distinct from the contest location 212*a*. For example, second location 212*b* may be the second user's home or any other location distinct from the contest location 212*a*. Similarly, third location 212*c* may be a public venue, such as a restaurant. Like first user 208*a*, users 208*b*, 208*c* may place wagers on the likelihood of events occurring or not occurring during the contest while the contest is ongoing. While locations 212*b*, 212*c* are illustrated as locations in which users 208*b*, 208*c* can watch the contest, embodiments are not limited to users 208*b*, 208*c* viewing the contest while placing wagers on the contest.

Also illustrated in FIG. 2 is contest state service(s) 214. Contest state service(s) 214 may be an API that communicates real-time (or near real-time) contest data 216 to server 202 such that server 202 can take actions based on the contest data 216, such as adjusting the odds offered on markets available to users 208*a*, 208*b*, 208*c*. The contest data 216 may be in the form of a JSON or XML file or the like. For example, for a football game, service(s) 214 may communicate play-by-play information (referred to as event data 218*a*) to server 202, which may include information such as which players were in for the play, other game data associated with the play (e.g., down, distance, etc.), whether a penalty was called on the play, and the like. The contest data 216 may also include state data 218*b* indicative of a state of play for the contest. The state of the contest may be one of a live state (where play is live) or a break state (where play is not live). For example, for a football game, the break state may be set when the game is in a TV timeout or is at half time. It is contemplated that more granular break states may be set (e.g., break-injury timeout, break-half time) and that the dynamically set wager delays may be based on a specific type of break. For example, server 202 may identify both a TV timeout and an in-game timeout taken by a team as break states but may apply different wager delays for these different break types.

It will be appreciated that the contest data 216 may not explicitly state that a state of the contest is a break state, and that server 202 may be configured to parse the received data and make a determination on the state accordingly. For example, server 202 may be configured to parse received contest data 216 data that indicates a team called timeout in the game and make a determination based on the parsed data as the game being in a break state. Likewise, server 202 may be configured to parse contest data 216 for a baseball game that indicates a team is making a pitching change as also being in a break state. As a concrete example, an XML message transmitted by contest data 216 to server 202 for a football game may include a string such as "event id='XYZ' clock='10:00' type='tv_timeout' description='TV Timeout,'" and server 202 may be configured to analyze this contest data 216 to identify state data 218*b* (e.g., the type=tv_timeout) to determine that the football game is in a break state such that the wager delay can be appropriately set. Thus, in some embodiments, server 202 analyzes specific fields (e.g., the "type" field) of contest data 216 to determine whether the contest is in a break state or a live state.

In some embodiments, the server 202 and the service(s) 214 may be coupled in a publication/subscription architecture, where server 202 subscribes to contest data 216 published by service(s) 214. It will be appreciated that the contest data 216 provided by service(s) 214 will vary based on the contest being played. For example, a basketball game or a tennis match will have different contest data 216 than the football game. Server 202 may be also configured to parse the contest data 216 received from service(s) 214 to adjust the wagers offered by system 200 as will be appreciated by one of skill in the art. For example, the server 202 may also adjust the odds for a market based on event data 218*a*, such as play data, that is transmitted as part of contest data 216.

As previously discussed, users can take advantage of the delay between (1) an event occurring in the contest, (2) the event being captured by service(s) 214, (3) the event being communicated from service(s) 214 to server 202, and (4) processing by server 202 to make any changes to the offered markets based on the event. Accordingly, a wager delay may be enacted for users to allow server 202 the time to process the data such that users cannot bet on events that have already occurred but have not yet been communicated to server 202. However, only using a static wager delay can lead to a poor user experience as previously discussed, Additionally, while it may be desirable to place a wager delay on users at contest location 212*a* during the contest for security reasons, when the contest is at a break period, enabling the users to place a wager without a wager delay can improve the user experience for the user.

Accordingly, a wager delay may be dynamically enacted for users during a contest. In some embodiments, a static wager delay is set throughout the duration of a live contest for security purposes, and the dynamically changing wager delay (also referred to herein as an additional wager delay or simply a wager delay) is added on top of the static wager delay. In some embodiments, the wager delay is only applied to a subset of users. The subset of users may be those users determined to be attending the contest in person, i.e., those users whose location matches the contest location 212*a* while non-attending users may place live wagers with no delay or with only the static wager delay.

In some embodiments, the wager delay is dynamic such that the wager delay changes throughout the duration of a contest. The wager delay may be evaluated continuously as contest data 216 is received at server 202. The wager delay may be dynamic such that the wager delay is enabled only during periods of the contest considered to be "live" and is disabled for periods of the contest that are not live or are on break. For example, for a football game, the break period may include the time between quarters, when the game is at a TV or other timeout (e.g., an injury timeout), between plays, or the like, or any combination thereof, as described above. As another example, a baseball game may be considered to be on break between innings, between batters, during a pitching change, or the like, or any combination thereof. As yet another example, a tennis match may be considered to be on break between sets. As discussed above, service(s) 214 provides contest data 216 to server 202 such that server 202 can parse state data 218*b* from the contest data 216 to determine when the contest is live or on break.

In some embodiments, the wager delay is further adjusted on a per-user basis. As one example, users 208*b*, 208*c* that are not at contest location 212*a* may have a shorter wager delay, no wager delay, or only the standard wager delay enacted while placing live wagers. For example, the non-attending users 208*b*, 208*c* may only have the static wager delay enacted while play is live and may have the wager delay removed entirely during break periods, while in-attendance user 208*a* may have the static wager delay maintained during break periods and the additional wager delay added during live play. As another example, different users that are in attendance at the contest may have different wager delays enacted. Enacting different wager delays for different users may be done as a part of an incentive program offered by system 200, for example. For example, system 200 may indicate certain users as "valued users", such as based on the user's history, and may reward the valued users by setting a lower wager delay or disabling the wager delay for these valued users entirely. The determination of whether a user is a valued user may be based on the user's wager history, the user's subscription to a service offered by the system 200 (e.g., a premium subscription offered by system 200), or the like.

Locating a user 208*a*, 208*b*, 208*c* to determine the user is in the contest location 212*a* for determining whether to apply the additional wager delay may be done in various ways. In some embodiments, computing devices 206*a*, 206*b*, 206*c* interface with geolocation service 220 that determines the location of 206*a*, 206*b*, 206*c*. The computing devices 206*a*, 206*b*, 206*c* may interface with geolocation service 220 via the wagering application provided by system 200, which may be required to obtain location data of users 208*a*, 208*b*, 208*c* placing wagers for compliance purposes. Thus, this location data may also be leveraged to determine whether the user is at contest location 212*a*. The location may be reported to server 202, which may be compared to contest location 212*a*. Typically, the location of the contest is a known location, such as a stadium having a fixed address. For example, databases 204 may have location data stored for various contest locations 212*a* (e.g., stadiums, arenas, etc.), such as in a lookup table. In some embodiments, the contest location 212*a* can be preset if the location is not already stored in one or more databases 204. For example, if an event is taking place at a convention center or other location that is not a dedicated contest location, this location may be preset within system 200 when offering markets on the contest. However, it will be appreciated that the location of the contest may be determined using geolocation services, may be defined by a user, or may be determined using any other method. As another example, contest location 212*a* may have a geofence 222 associated therewith that system 200 can use to determine whether a user 208*a*, 208*b*, 208*c* is in contest location 212*a*. The geofence 222 may be used to track users who enter and exit the geofenced area and may report this data to server 202.

In some embodiments, the location of the user 208*a* may be determined based on a wireless network, a cellular tower, or any other communication network 224 to which the computing device 206*a* is connected. For example, the location of a cellular tower to which computing device 206*a* is connected may be compared to the contest location 212*a* to determine that the computing device 206*a* may be at the contest location. Similarly, computing device 206*a* may be connected to a Wi-Fi network provided by the contest stadium (e.g., a public stadium Wi-Fi network), which may be used to determine the location of the user 208*a*.

In some embodiments, sensor data, besides (or in addition to) geolocation data, may be used to determine the location of the user 208*a*. For example, it is contemplated that during the contest, crowd noise may be detected by one or more sensors 226 located at contest location 212*a*. Correspondingly, a sensor 228, such as a microphone, on a computing device 206*a*, 206*b*, 206*c* may detect the same crowd noise. By comparing the crowd noise detected by sensor 226 with the crowd noise detected by the sensor 228 on a computing device 206*a*, 206*b*, 206*a*, the location of the user 208*a*, 208*b*, 208*c* may be determined. For example, a sensor 228 on computing devices 206*a* may record the crowd noise at the same time or near the same time as one or more sensors 226 such that it may be determined user 208*a* is in contest location 212*a*. In contrast a sensor 228 on second computing device 206*b* may record the crowd noise thirty seconds after one or more sensors 226, indicating that the user 208*b* is watching the contest on a delay (e.g., via a streaming service). Additionally, a sensor 228 on third computing device 206*c* may not record any audio similar to the crowd noise captured by one or more sensors 226, indicating the third user 208*c* is not watching the contest. Such a determination, which may have a lower confidence level associated therewith, may be combined with other information to make a final determination on the location of first user 208*a* when determining whether to enact the wager delay on the first user 208*a*. For example, determining that 228 on first user 208*a* measured the crowd noise near simultaneously as one or more sensors 226, along with data indicating the computing device 206*a* connected to cellular towers nearby to the contest location (e.g., within a threshold radius) may together be used to determine that first user 208*a* is at the contest in person and that an additional wager delay should be enacted for the first user 208*a*. In contrast, users 208*b*, 208*c* may be allowed to live wager on the contest with little to no additional wager delay based on the determination the users 208*b*, 208*c* are watching the contest with a delay or are not watching the contest.

As another example for determining user location, it is contemplated that the wagering application on computing devices 206*a*, 206*b*, 206*c* may integrate with one or more social media accounts of the user 208*a*, 208*b*, 208*c*. Accordingly, the social media activity may be leveraged to determine the location of the user. For example, if the first user 208*a* makes a social media post that indicates the user is at the contest location 212*a*, the wager application may use the social media information (in combination with other information, in some embodiments) to determine the location of the first user 208*a* is contest location 212*a*.

Along with the users determined to be at contest service 214, the additional wager delay may be enacted for other users. For example, users who are exhibiting suspicious activity or have a known history of suspicious activity may have a wager delay enacted. Determining that a user is exhibiting suspicious activity may be based (in part or in whole) on the wager activity of the user. For example, users who place large wagers (e.g., a wager exceeding a threshold), a large number of wagers (e.g., a number of wagers exceeding a threshold), wagers exceeding the user's normal wager amount and/or volume, or the like, or any combination thereof may be indicative of suspicious activity. In some embodiments, the aforementioned indicators are only analyzed for wagers that are placed shortly before odds change (e.g., under 10 seconds). For example, consider the scenario where first user 208*a* that is attending the contest in person may be communicating with second user 208*b* (e.g., via SMS or a phone call using computing devices 206*a*, 206*b*) while the contest is live to provide information about events during the contest such that the second user 208*b* can place wagers on the contest before the odds are updated by server 202. Thus, in this example scenario, a repeated pattern of second user 208*b* placing wagers on events that have changing odds shortly after the wagers are placed may indicate suspicious activity of second user 208*b*. Accordingly, the wager delay may be enacted or adjusted for second user 208*b* despite second user 208*b* not being in attendance at the contest.

It is contemplated that contest data 216 from service(s) 214 may be used by server 202 to dynamically adjust other parameters for markets offered for the live contest along with adjusting the wager delay. For example, the contest data 216 may be used to automatically adjust a wager limit set by system 200, which is the limit on the winnings attainable on a single wager (including a parlay). For example, as the contest progresses, system 200 may increase the wager limit. The indication of the contest progressing can likewise be parsed from the contest data 216 received from service(s) 214 (e.g., contest data 216 may be parsed to determine a football game is at halftime). In some embodiments, the wager limit changes based on the wager delay. For example, the wager limit may increase as the wager delay increases and may decrease as the wager delay decreases. In some embodiments, the odds for a market may be adjusted based on the wager delay for a wagering user 208*a*, 208*b* 208*c*. For example, a user with a higher wager delay may be offered improved odds relative to a user with a lower wager delay who may be a higher risk of abusing the lower wager delay.

Increasing the wager limit may be done as system 200 receives additional data that provides system 200 with an increased confidence level of the predictability of the events. For example, system 200 may be configured to increase the wager limit when service(s) 214 indicates that the football game is at halftime. Because a half's worth of data from the contest has been received by halftime, system 200 may have a greater confidence level of predicting events occurring in the second half for offering wagers on those events. As another example, the occurrence of an event in the contest may cause system 200 to adjust the wager limit. For example, if the event data 218*a* from service(s) 214 indicates that a team's star player was injured on the first play of the game, system 200 may increase the wager limit on markets associated with the outcome of the game because of the increased confidence of the other team winning the game. At the same time, the system 200 may lower the wager limit for wagers placed on events associated with the performance of the star player's replacement because of the reduced confidence in predicting the performance of the replacement.

Figure 3:
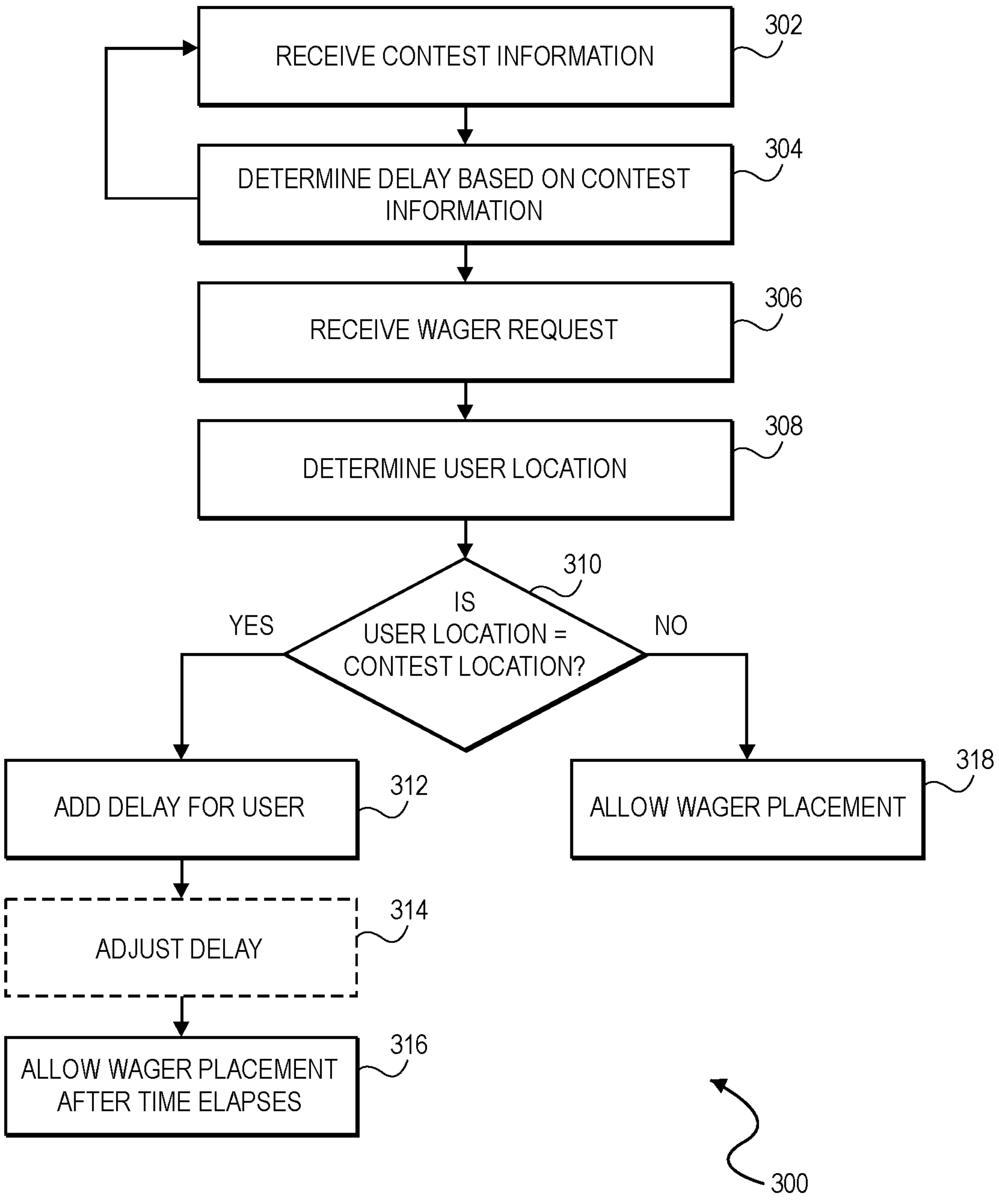
FIG. 3 illustrates an exemplary method for dynamically setting wager delays.

Turning now to FIG. 3, a method 300 in accordance with aspects of the present disclosure is illustrated. Method 300 may begin at step 302 where contest data 216 is received. The contest data 216 may be received from a contest service 214, which may be, for example, an API or other service configured to provide live updates about a contest to server 202. The contest data 216 may be provided to server 202 as an XML or JSON document or in any other format and may include real-time or near real-time data for the live contest that can be parsed by server 202 to determine a state of the contest. For example, an API that provides play-by-play information for a football game may include play information such as the play result and players involved and may also include information such as when a timeout is taken that may be parsed by server 202 to determine the state of the contest as previously discussed. In some embodiments, a publisher/subscriber architecture is used where server 202 subscribes to events published by service(s) 214.

Next, at step 304, a wager delay may be determined based on contest data 216 received at step 302. As discussed above, the wager delay may be set based on the state of the contest. For example, when the contest state is in a break state, the wager delay may be set to zero such that a wagering user experiences no delays when placing wagers on the contest. In some embodiments, the wager delay is an additional wager delay applied to a static wager delay that is enacted for the duration of the contest irrespective of the contest state. As such, when the contest is in a live state, the additional wager delay may be enacted. Steps 302 and 304 may occur in a continuous or near continuous loop such that the wager delay is repeatedly being evaluated throughout the contest.

At step 306, a wager request for the contest may be received. The wager request may be received via a mobile application, a desktop application, a website, or the like provided by system 200 via which users 208*a*, 208*b*, 208*c* can place wagers on contests. For example, via user computing devices 206*a*, 206*b*, 206*c*, users 208*a*, 208*b*, 208*c* may interact with a mobile application to place wagers on contests that are communicated to server 202 via one or more networks 210.

Next, at step 308, the location of the wagering user may be determined. The user location may be determined in various ways as discussed above. For example, the application that the wagering user utilizes to place the wager may require the user's location before the wager can be placed. As another example, a network, such as a Wi-Fi network 224 or cellular tower that the wagering user is connected to (or was recently connected to) may be used for determining the user's locations. For example, server 202 may determine cellular towers that a user is currently connected to and/or was recently connected to and may make a location determination based on the proximity of the cellular towers to the contest location 212*a*.

Once the location of the wagering user is determined, at test 310, it may be determined whether the location of the wagering user matches the contest location 212*a* or is within a certain distance (e.g., a threshold radius) or contest location 212*a*. The contest location 212*a* may be a known location, such as the address or coordinate location of a stadium or arena in which the contest is taking place, which may be stored in one or more databases 204 and/or obtained in an ad hoc manner from an external database storing the location of the contest.

If, at test 310, it is determined that the location of the wagering user is the contest location 212*a*, processing may proceed to step 312 where the wager delay determined at step 304 is enacted for the user. Accordingly, when the wagering user attempts to place a wager while the wager delay is enacted, the wager does not immediately process.

At optional step 314, the wager delay may be adjusted. As previously discussed, the wager delay may be adjusted for various reasons. For example, the wager delay may be lowered or altogether eliminated based on the user being a valued user. As another example, the wager delay may be increased based on the user exhibiting suspicious behavior, as discussed further below with respect to FIG. 4. Thus, different users may receive different wager delays at the same time during a live contest.

At step 316, the wager may be placed upon the wager delay elapsing. In some embodiments, once the wager delay elapses, the wagering user is required to accept a prompt to confirm the user wishes to place the wager. In some embodiments, the wager is automatically applied with any odds changes that were enacted while the wager delay was active. In some embodiments, the wager is canceled if the odds change from when the wager was requested by the user and when the wager delay elapses. For example, if the market for the wager is no longer available after the wager delay elapses, the wager may be canceled. This may occur, for example, when the user attempts to place a wager on an event (e.g., a player scoring a goal), and during the time of the wager delay, the event happens and is communicated from contest service 214 to server 202 such that server 202 no longer offers the market or the market is temporarily unavailable while the odds are adjusted based on the occurrence of the event.

If, at test 310, it is determined that the location of the wagering user is not the location of the contest, processing may proceed to step 318 where the placement of the wager may be allowed without any wager delay on the placement. As previously discussed, the wager delay may be an additional wager delay such that step 318 involves allowing the wager to process without any additional delay rather than processing without any wager delay.

Figure 4:
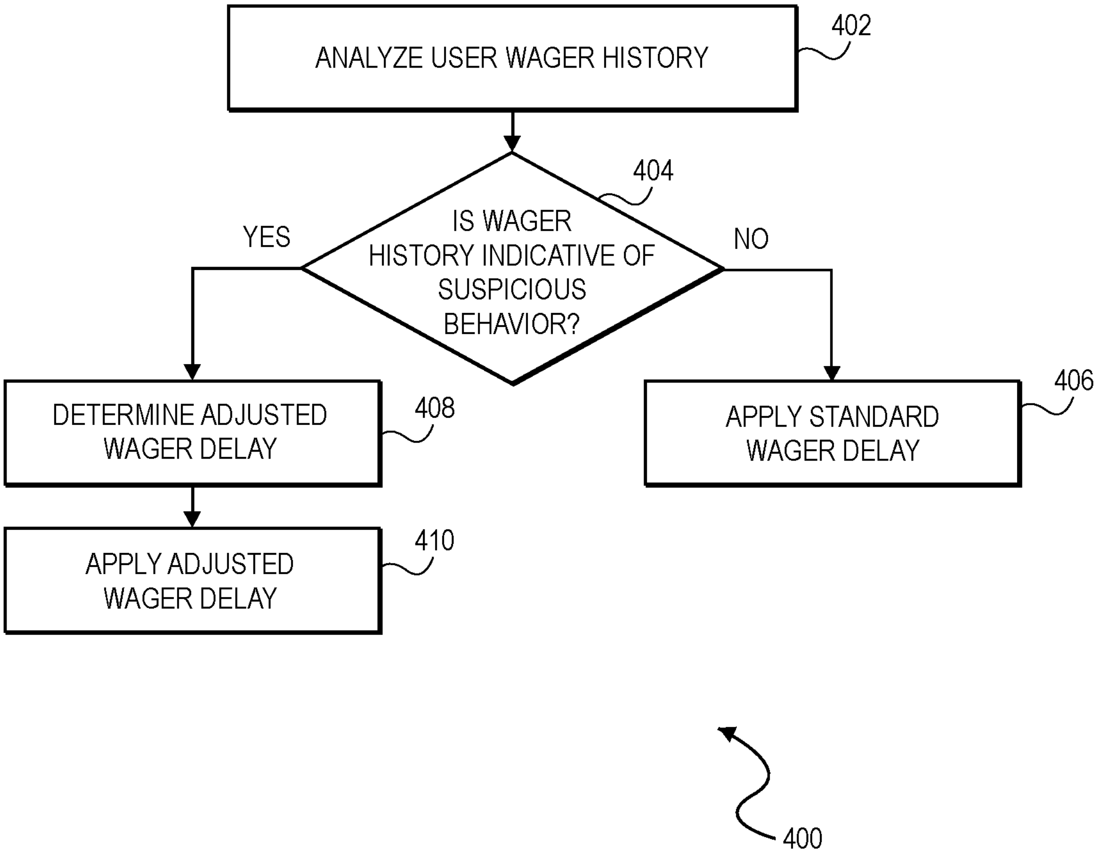
FIG. 4 illustrates an exemplary method for adjusting a wager delay based on user activity.

FIG. 4 illustrates a method 400 in accordance with embodiments of the present disclosure. Method 400 provides a method 400 for determining that a user may be exhibiting suspicious activity such that a wager delay (or an increased wager delay) can be placed on the user. At step 402, historical wager data may be received for a user. The historical wager data may include all wager data for a user, a subset of the most recent data for the user (e.g., the user's last three months of wagers, last 50 wagers, or the like), may include only wagers placed on the live contest, or any combination thereof. Other qualifiers may be used for selecting wager data to analyze to determine suspicious activity. For example, only wagers placed on live contests may be analyzed for determining whether the user is exhibiting suspicious wagering behavior.

Next, at test 404, it may be determined whether the wager activity is indicative of suspicious behavior. Determining whether wager activity is indicative of suspicious behavior may be based on (1) stake size, (2) wager volume (i.e., number of wagers placed), (3) temporal proximity to odds changes, or the like, or any combination thereof. If, at test 404, it is determined that the wager activity is not indicative of suspicious wager activity, the wager may be placed at step 406 with the wager delay determined as discussed with respect to FIG. 3.

If, at test 404, it is determined the wager history of the user is indicative of suspicious activity, processing may proceed to step 408, where an adjusted wager delay may be determined. In some embodiments, the adjusted wager delay is an increase relative to the wager delay provided to other users. The wager delay may be increased to reduce the risk of exploitive live wagering behavior by the suspicious user. Other preventative measures, such as preventing live wagering entirely for a user, may be enacted.

The adjusted wager may then be applied at step 410 such that the user can place the wager after the time of the adjusted wager delay elapses. It is contemplated that a machine learning model may be trained to detect abusive users. For example, the machine learning model may be trained on historical wager activity of past users who placed high wagers, large volume wagers, or wagers near to when odds changes were enacted to improve the detection of future users who attempt to take advantage of the delay in data being sent from contest location 212*a* for processing by server 202 to update the offerings provided by system 200.

Figure 5:
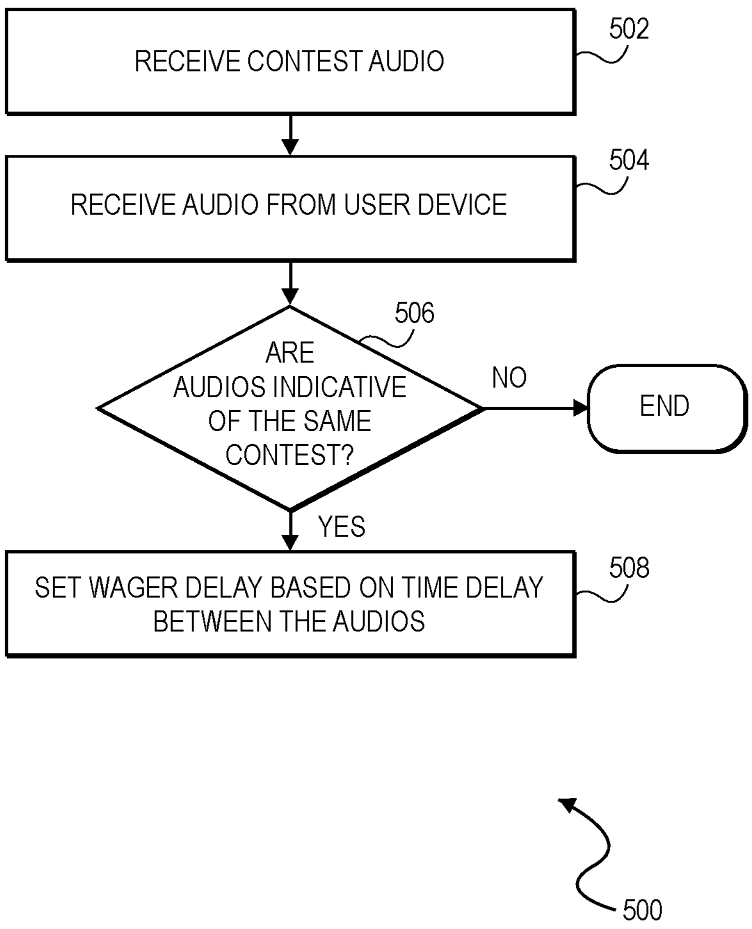
FIG. 5 illustrates an exemplary method for adjusting a wager delay based on audio data.

Turning now to FIG. 5, a method 500 for determining the location of the user is illustrated in accordance with embodiments of the present disclosure. Method 500 may begin at step 502 where contest audio may be received. The contest audio may be received from sensors 226, such as microphones, in the contest location 212*a*. The contest audio may include crowd noise that may be analyzed for similarity to other audio data.

Next, at step 504, audio from a user device 206*a*, 206*b*, 206*c* may be received. The audio may be received using a sensor 228 associated with the user device 206*a*, 206*b*, 206*c*, such as a microphone on a mobile phone. When users 208*b*, 208*c* are viewing the game remotely, the users 208*b*, 208*c* receive a delayed broadcast. Thus, the audio captured by the user device 206*b*, 206*c* may be delayed relative to the audio captured at the contest location 212*a*.

At test 506, the audio from the contest and the audio from the user device 206*b*, 206*c* may be compared. The audios may be compared to determine similarities in the audios. For example, similar volume spikes in the two audios may indicate that the audios are similar. For example, at a first time, a crowd cheer in contest location 212*a* may cause a volume spike captured by the contest sensors, and ten seconds later, user 208*b* may capture the same volume spike while streaming a broadcast of the game via cable, and thirty seconds later, user 208*c* may capture the same volume spike while streaming a broadcast of the game via the Internet. This, in turn, may indicate that the users 208*b*, 208*c* are not watching the contest occurring at contest location 212*a*, and a corresponding, per-user wager delay may be enacted.

If, at test 506, it is determined that users 208*b*, 208*c* are watching the live contest, processing may proceed to step 508, where a wager delay may be set based on the delay between the audios. For example, if the audio delay is greater than the time it takes for server 202 to make changes to the markets and/or odds, the additional wager delay may be set to zero. If the audio delay is lower than the time it takes system 200 to adjust the markets and/or odds, the additional wager delay may be set to ensure that users 208*b*, 208*c* are not viewing the events in the live contest before server 202 can adjust their offerings accordingly. Because users 208*b*, 208*c* are determined to be viewing the contest with different delays, each user 208*b*, 208*c* may be provided a different wager delay. If, at test 506, the audios are not the same such that it is determined the user 208*b*, 208*c* is not viewing the contest being played, processing may end, and the standard wager delay for wagering on the live contest may be enacted for the user 208*b*, 208*c*.

User Interfaces

Figure 6A:
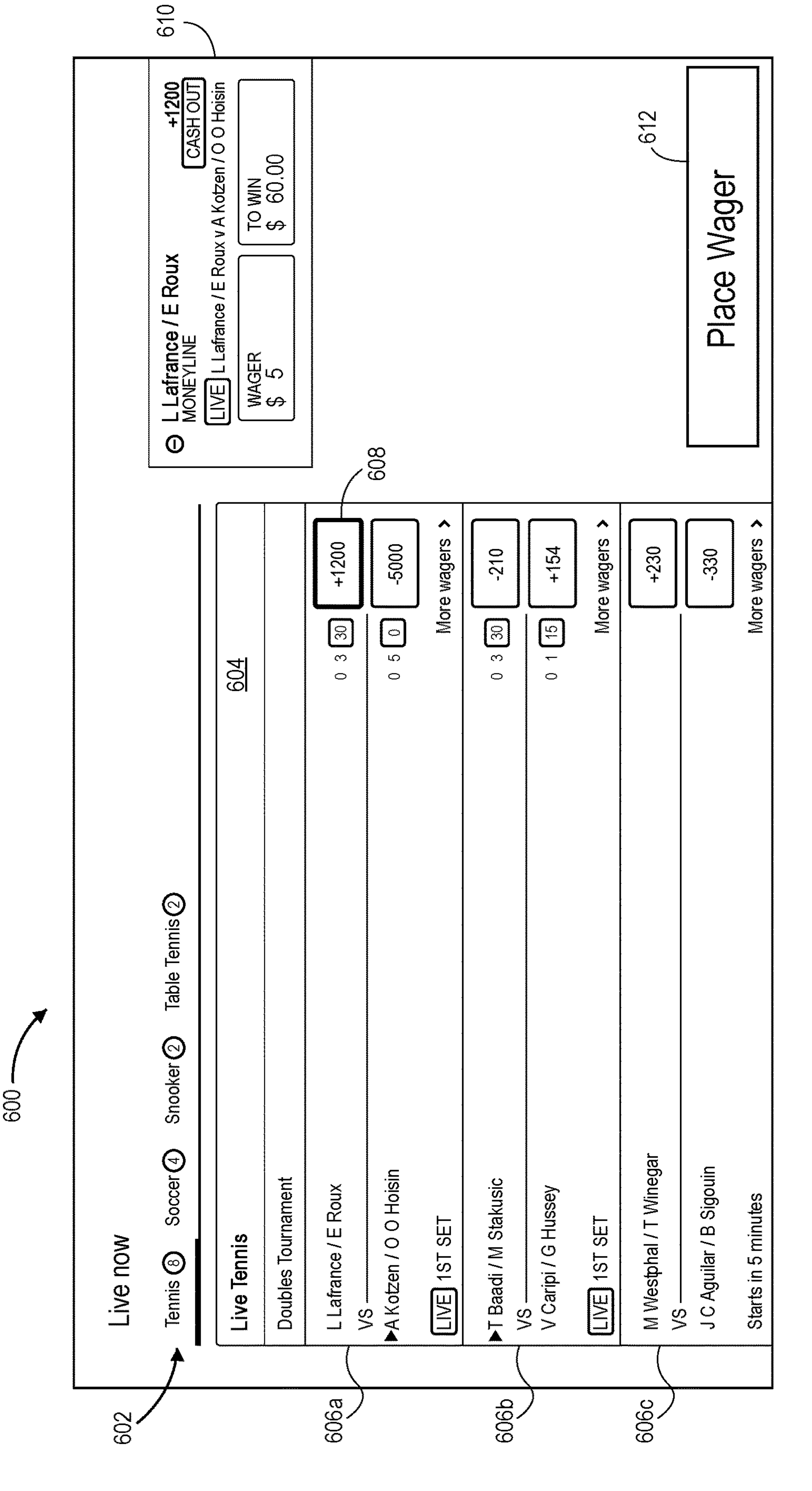
FIGS. 6A-6C illustrate exemplary user interfaces in accordance with embodiments of the present disclosure.
Figure 6B:
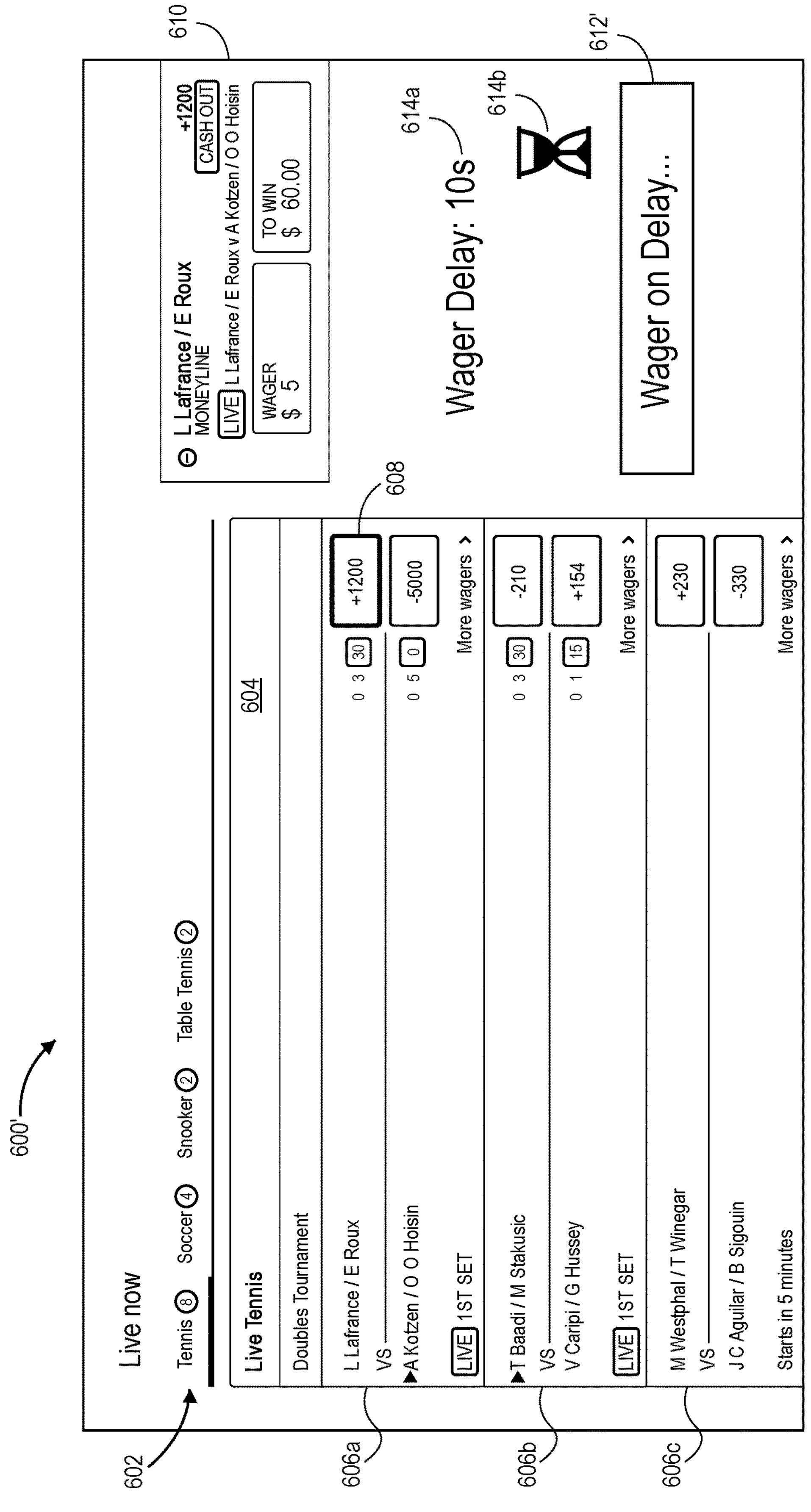
Figure 6C:
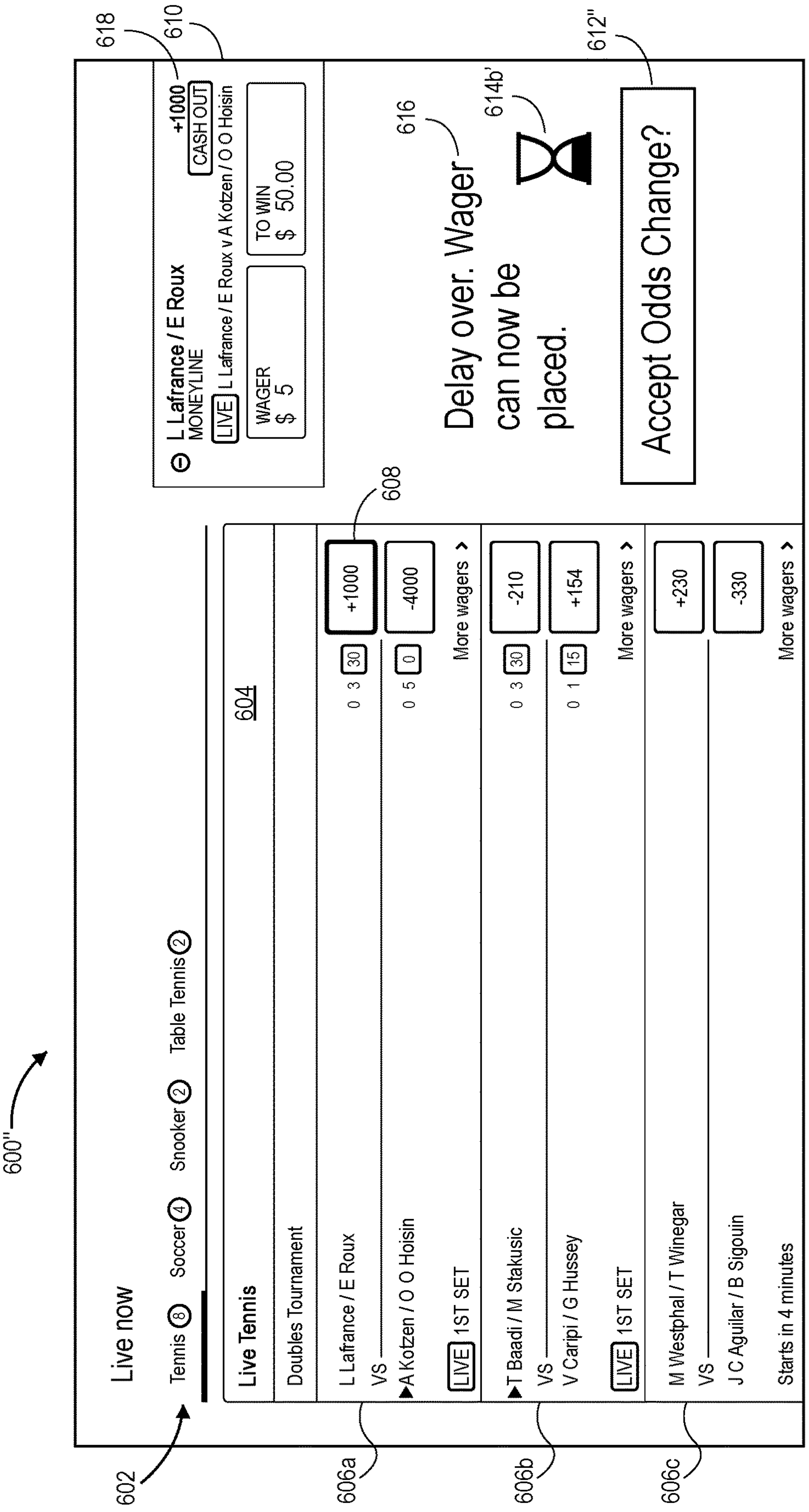

FIGS. 6A-6C illustrate exemplary user interfaces in accordance with embodiments of the present disclosure. User interfaces 600, 600', 600" illustrate an example user interface flow for wagering on a live contest in accordance with aspects of the present disclosure. User interfaces 600, 600', 600" may be displayed via a wagering application operating on user computing devices 206*a*, 206*b*, 206*c*, for example.

Looking first at FIG. 6A, a first user interface 600 is illustrated, depicting a user interface by which a user may place a wager on a live contest. First user interface 600 includes a list of contest tabs 602 grouped by type (e.g., sport) that may be selected to display live contests for the selected type. First user interface 600 may also include a wager pane 604 that depicts live contests and available markets for the selected live contest type. For example, a first contest 606*a*, a second contest 606*b*, and a third contest 606*c* are depicted with corresponding wagers 608 available for betting. Contests 606*a*, 606*b* are ongoing contests, while third contest 606*c* is nearing its start time, and therefore, is displayed with the other live contests 606*a*, 606*b*. In some embodiments, contests are considered live at a preset time before the contest actually begins such that all wagers received for the contest after the preset time are considered to be live wagers.

Various information relating to the live contest may be shown in wager pane 604. For example, as shown, the live contests 606*a*, 606*b*, 606*c* are live tennis doubles matches, and each player in each match is shown. Additionally, the current score is shown, which may update as the contest progresses. Wagers 608 are also shown. The wagers 608 may be displayed as selectable user interface elements allowing the user to place a wager on the selected market.

When a wager 608 is selected, a bet slip 610 may be populated with the selected wager and associated information. For example, as shown, the user has selected to place a moneyline wager on a duo winning the tennis match. This information may then be populated in bet slip 610. Bet slip 610 may include user input fields allowing the user to input a wager amount and bet slip 610 may display the amount the user will win if the bet is correct. First user interface 600 may also include a place wager affordance 612 that may be actuated by the user to place the wager shown in bet slip 610. While bet slip 610 shows a single wager, it will be appreciated that the user may add more than one wager to bet slip 610, and may place live wagers on parlays, along with on single bets.

Turning now to FIG. 6B, user interface 600' is shown, depicting a user interface for live wagering when a wager delay is applied. User interface 600' may be displayed when the user requests to place a live wager (e.g., by selecting place wager affordance 612) and a wager delay is enacted. As shown, 600' may include indicators 614*a*, 614*b* that indicate a wager delay is enacted. A first indicator 614*a* may provide a textual indication of the wager delay. A second indicator 614*b* may provide a graphical indicator of the wager delay. Any combination of indicators 614*a*, 614*b* may be used to indicate to the user that the wager is on a delay. It is contemplated the second indicator 614*b* may update as the wager delay changes. Additionally, affordance 612' is updated to indicate the wager is on a delay. At this point, affordance 612' may not be actuatable by the user until the wager delay elapses.

Turning now to FIG. 6C, user interface 600" depicting the user interface when the wager delay elapses is illustrated for some embodiments. As discussed above, after the wager delay elapses, the user may elect to place the selected wager. User interface 600" may include an indicator 616 indicating to the user that the wager delay has elapsed. Additionally, graphical indicator 614*b*' may update to show that the wager time elapsed. In some embodiments, affordance 612" likewise updates to allow the user to affirm that they wish to place the wager with the odds change. Affordance 612" may again be selectable for the user to choose to place the wager. As shown, the odds 618 on the wager have decreased from +1200 to +1000 during the wager delay. Thus, system 200 may require confirmation from the user that the user still wishes to place the wager. As previously discussed, in some embodiments, the market may be removed from offering due to events during the wager delay. For example, if the wager 608 was instead for a market that a player would serve an ace, and the player served the ace while the wager delay was active, the market may be removed, and the user may be prevented from wagering on that market.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments, what is claimed as new and desired to be protected by Letters Patent includes the following:

1. A system for dynamically enacting delays for placing wagers, comprising:
- at least one server communicatively coupled to a live contest service and configured to receive live contest data of a contest from the live contest service; and
- one or more non-transitory computer-readable media storing computer-executable instructions that, when executed by at least one processor, cause the system to carry out actions, comprising:
  - receiving, during the contest and from a user operating a user computing device, a request to place a wager on the contest;
  - determining a location of the user;
  - responsive to determining the location of the user is a contest location for the contest, determining a state of the contest based on the live contest data received from the live contest service;
  - responsive to determining the state of the contest is a live state, enacting a wager delay for the wager;
  - receiving first audio data from one or more sensors at the contest location and second audio data from the user computing device,
  - wherein a time for the wager delay is set based on a comparison of the first audio data to the second audio data; and
  - responsive to the wager delay ending, allowing placement of the wager by the user.

2. The system of claim 1, wherein the user is a first user, the wager is a first wager, the request is a first request, and wherein the actions further comprise:
- receiving, from a second user, a second request to place a second wager on the contest;
- determining a second location of the second user; and responsive to determining the second location of the second user is not the contest location, allowing the placement of the wager by the second user without enacting the wager delay on the second wager.

3. The system of claim 1, wherein determining the location of the user is based on a geolocation obtained from the user computing device.

4. The system of claim 1, wherein determining the location of the user is based on comparing a network that the user computing device is connected to one or more networks associated with the contest location.

5. The system of claim 1, wherein the comparison of the first audio data to the second audio data comprises determining a temporal difference in volume spikes in the first audio data and the second audio data to determine a time delay of the user viewing the contest.

6. A method for dynamically enacting delays on wagers, comprising:

receiving, during a contest, a plurality of contest data for the contest;

determining, based on the plurality of contest data, whether the contest is in a live state or a break state;

responsive to determining the contest is in the live state, enacting a wager delay for placing a wager on the contest;

receiving, from a first user operating a first computing device, a first request to place a first wager on the contest;

responsive to determining a first location of the first user is a contest location of the contest, determining a time of the wager delay for the first user, wherein determining the time of the wager delay comprises:

receiving first audio data from one or more sensors at the contest location of the contest and second audio data from the first computing device; and determining the time of the wager delay based on a comparison of the first audio data to the second audio data;

receiving new contest information for the contest; and responsive to determining the contest is in the break state based on the new contest information, disabling the wager delay for the first user.

7. The method of claim 6, wherein the method further comprises:

receiving, from a second user operating a second computing device, a second request to place a second wager on the contest; and responsive to determining a second location of the second user is not the contest location, allowing the wager to be placed without the wager delay.

8. The method of claim 6, wherein determining whether the contest is in the live state or the break state comprises parsing the plurality of contest data for information indicative of a state of the contest.

9. The method of claim 8, wherein the state is the break state, wherein the time for the wager delay is further based on a type of the break state.

10. The method of claim 6, wherein the method further comprises adjusting a wager limit based on the plurality of contest data.

11. The method of claim 6, wherein the wager delay is a first wager delay and wherein the method further comprises:

enacting, for a second user at the contest location, a second wager delay distinct from the first wager delay.

12. The method of claim 6, wherein the method further comprises:

responsive to determining one or more past wagers of the first user are indicative of suspicious activity, adjusting the wager delay for the first user.

13. One or more non-transitory computer-readable media storing computer-executable instructions that, when executed by at least one processor, perform a method of dynamically setting wager delays for placing wagers on a contest, comprising:

receiving, during a live contest and from a user operating a user computing device, a request to place a wager on the live contest;

responsive to receiving the request, determining a location of the user;

responsive to determining the location of the user is a contest location of the live contest, placing a wager delay on the wager;

receiving, in real time, a plurality of contest data from a live contest service;

receiving first audio data from one or more sensors at the contest location and second audio data from the user computing device;

determining a time for the wager delay based on the plurality of contest data and a comparison of the first audio data to the second audio data; and allowing the wager to be placed after the time for the wager delay elapses.

14. The media of claim 13, further comprising:

receiving an additional request to place an additional wager on the live contest;

responsive to receiving, from the live contest service, new contest data, determining an adjusted time for the wager delay based on the new contest data; and allowing the additional wager to be placed after the adjusted time for the wager delay elapses.

15. The media of claim 14, wherein the new contest data indicates a break period for the contest, wherein the adjusted time for the wager delay is zero.

16. The media of claim 13, wherein the wager delay is a first wager delay, and further comprising:

enacting a second wager delay throughout the live contest, wherein the first wager delay is added to the second wager delay.

17. The media of claim 13, further comprising adjusting a wager threshold based on the plurality of contest data.

18. The media of claim 13, wherein the user is associated with a user value, and wherein determining the time for the wager delay is further based on the user value.

19. The media of claim 13, wherein the user is a first user, the request is a first request, the wager is a first wager, and the time is a first time, and further comprising:

receiving, from a second user, a second request to place a second wager on the contest; and setting, for the second user, a second time for the wager delay distinct from the first time for the first user.

20. The system of claim 1, wherein the wager delay is a dynamic wager delay, the time is a first time, and wherein the actions further comprise:

enacting, for at least a portion of the contest, a static wager delay having a second time; and combining the first time and the second time to obtain a combined wager delay time enacted for the wager.

* * * * *